United States Patent
Kawamura et al.

(10) Patent No.: US 6,760,286 B2
(45) Date of Patent: Jul. 6, 2004

(54) METHOD OF TRANSMITTING DATA AMONG A PLURALITY OF LSIS, AND RECORDING MEDIUM REPRODUCING APPARATUS USING THE METHOD

(75) Inventors: Akihisa Kawamura, Hirakata (JP); Masatoshi Shimbo, Mino (JP); Yoshihiro Mori, Hirakata (JP)

(73) Assignee: Matushita Electric Industrial Co., Ltd., Osaka (JP)

( * ) Notice: Subject to any disclaimer, the term of this patent is extended or adjusted under 35 U.S.C. 154(b) by 69 days.

(21) Appl. No.: 10/241,472

(22) Filed: Sep. 12, 2002

(65) Prior Publication Data

US 2003/0014565 A1 Jan. 16, 2003

Related U.S. Application Data

(63) Continuation of application No. 09/598,334, filed on Jun. 21, 2000, now Pat. No. 6,473,374.

(30) Foreign Application Priority Data

Jun. 21, 1999  (JP) ........................................... 11-598334

(51) Int. Cl.$^7$ ................................................ G11B 7/00
(52) U.S. Cl. ................. 369/47.1; 369/59.21; 369/59.23
(58) Field of Search ............................. 369/47.1, 59.21, 369/59.23, 47.19, 47.2, 47.27, 59.1

(56) References Cited

U.S. PATENT DOCUMENTS

| 4,393,276 A | 7/1983 | Steele |
| 5,463,606 A | 10/1995 | Kaneko et al. |
| 5,818,655 A | 10/1998 | Satoh et al. |
| 5,835,499 A | 11/1998 | Kimura et al. |

*Primary Examiner*—Nabil Hindi
(74) *Attorney, Agent, or Firm*—Wenderoth, Lind & Ponack, L.L.P.

(57) ABSTRACT

There is provided a recording medium reproducing apparatus in which a digital signal immediately before being inputted to a D/A converting LSI is prevented from being taken out and unfairly copied. A digital signal processing LSI and the D/A converting LSI are connected to each other through an external bus. A scrambling processing circuit for scrambling a digital signal outputted from a digital signal processing circuit is provided inside the digital signal processing LSI. A descrambling processing circuit for descrambling the scrambled digital signal transmitted through the external bus is provided inside the D/A converting LSI.

26 Claims, 12 Drawing Sheets

F I G. 9

| ATTRIBUTE INFORMATION | SCRAMBLING/DESCRAMBLING INFORMATION |
|---|---|
| 192KHz / 24bit | #1 |
| 96KHz / 24bit | #2 |
| 48KHz / 24bit | #3 |
| ... | ... |

↙ TABLE

SUBSTANCE OF SCRAMBLING/
↙ DESCRAMBLING INFORMATION

- FIRST SCRAMBLING/DESCRAMBLING INFORMATION
- SECOND SCRAMBLING/DESCRAMBLING INFORMATION
- THIRD SCRAMBLING/DESCRAMBLING INFORMATION
- ...

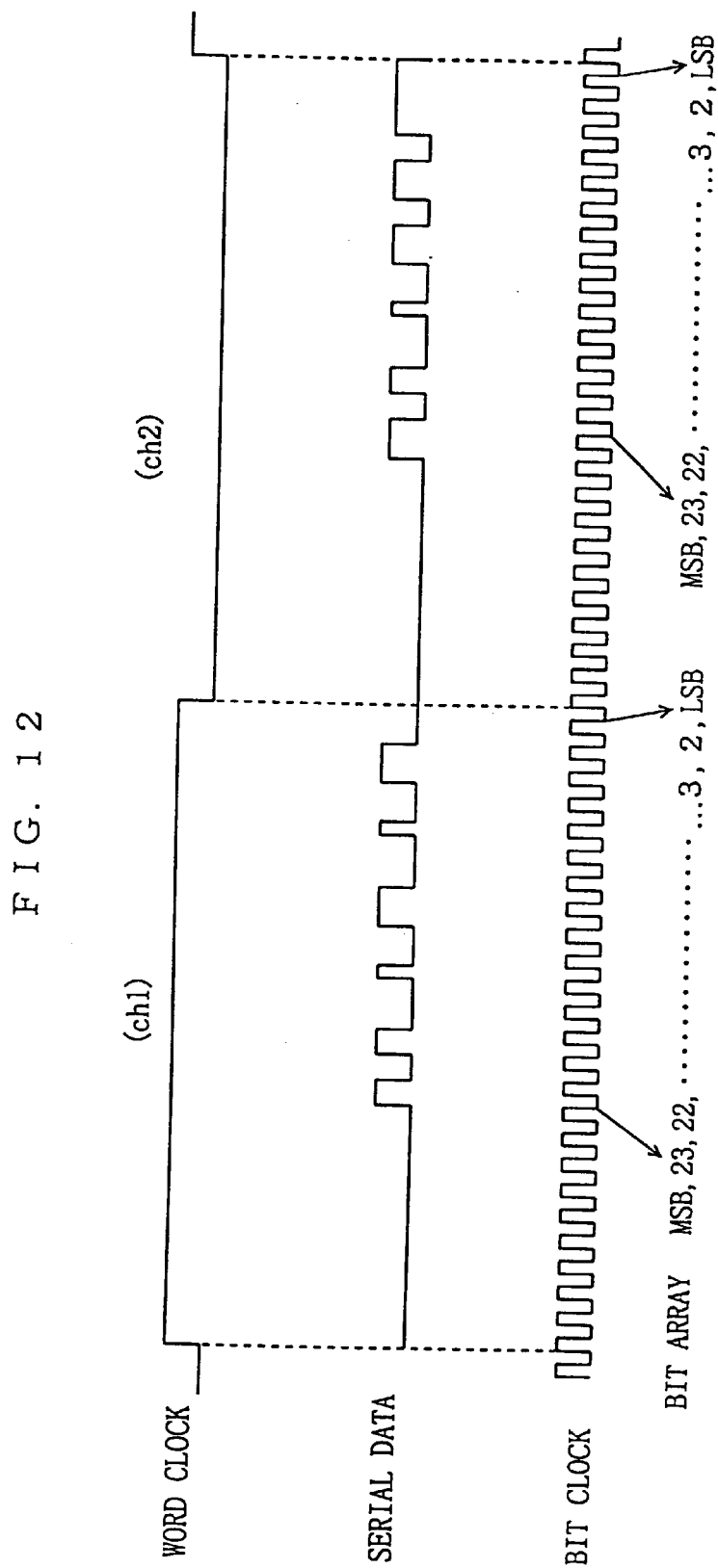

METHOD OF TRANSMITTING DATA AMONG A PLURALITY OF LSIS, AND RECORDING MEDIUM REPRODUCING APPARATUS USING THE METHOD

This is a Continuation of U.S. application Ser. No. 09/598,334, filed Jun. 21, 2000 now U.S. Pat. No. 6,473,374, the entire disclosure of which is incorporated herein by reference.

BACKGROUND OF THE INVENTION

1. Field of the Invention

The present invention relates generally to a method of transmitting data among a plurality of LSIs (Large Scale Integrated Circuits) which are connected to one another through an external bus, and more particularly, to a method of transmitting, in a DVD (Digital Versatile Disk) audio reproducing apparatus comprising a digital signal processing LSI and a D/A (Digital-to-Analog) converting LSI which are connected to each other through an external bus, a digital signal from the digital signal processing LSI to the D/A converting LSI through the external bus, and the DVD-Audio reproducing apparatus using the method.

2. Description of the Background Art

In recent years, A DVD-Audio standard for realizing multi-channel reproduction of a high-quality sound by recording mainly an audio signal on a DVD having a capacity of 4.7 GB in a single-sided one layer system has been determined, and a DVD-Audio reproducing apparatus for reproducing a DVD-Audio disk has been developed.

In the DVD-Audio standard, audio signals having various sampling frequencies, various numbers of quantization bits, and various numbers of channels can be recorded and reproduced. For example, an audio signal having a sampling frequency of 192 kHz, 24 quantization bits, and two channels can be recorded to reproduce a stereo sound having a maximum frequency of 96 kHz. Alternatively, an audio signal having a sampling frequency of 96 kHz, 24 quantization bits, and six channels can be recorded to reproduce a multi-channel sound having a maximum frequency of 48 kHz. Further, a variety of recording and reproduction can be performed. For example, a video signal is recorded on the DVD to reproduce an image together with a sound.

Examples of the sampling frequency of the audio signal include 192/96/48 kHz and 176.4/88.2/44.1 kHz. An example of the quantization bits are 24/20/16 bits.

FIG. 11 is a diagram showing the configuration of a portion related to the transmission of a digital signal from a digital signal processing LSI 6 to a D/A converting LSI 7 in a conventional DVD-Audio reproducing apparatus In FIG. 11, the digital signal processing LSI 6 and the D/A converting LSI 7 are connected to each other through external buses 13 to 15. The digital signal processing LSI 6 processes an incoming digital signal (a packet stream), to generate a digital signal. The D/A converting LSI 7 converts the digital signal outputted from the digital signal processing LSI 6 into an analog signal.

FIG. 12 is a timing chart showing the digital signal outputted from the digital signal processing LSI 6 shown in FIG. 11 (in a case where the number of channels is 2). In FIG. 12, a word clock is a clock signal representing the timing at which channels in serial data are switched, and is transmitted through the external bus 13 shown in FIG. 11. The serial data includes data representing two channels (ch1 and ch2), and is transmitted through the external bus 14 (when the number of channels is four, for example, another serial data including two channels (ch3 and ch4) is outputted in parallel with the serial data). A bit clock is a clock signal which is synchronized with the serial data, and is transmitted through the external bus 15 A bit array {MSB, 23, 22, 3, 2, LSB} on each of the channels ch1 and ch2 is obtained from the word clock, the serial data, and the bit clock As described above, in the conventional DVD-Audio reproducing apparatus, the digital signal processing LSI 6 and the D/A converting LSI 7 are provided on separate chips, and are connected to each other through the external buses 13 to 15. Therefore, the digital signal can be taken out of the external buses 13 to 15 between the digital signal processing LSI 16 and the D/A converting LSI 7 and unfairly copied. An ultrahigh-quality stereo sound and a high-quality multi-channel sound, as described above, can be easily reproduced from the digital signal immediately before being inputted to the D/A converting LSI 7 (see FIG. 12).

If the digital signal processing LSI 6 and the D/A converting LSI 7 are provided on a single chip, it is possible to prevent the digital signal from being taken out of the external buses 13 to 15 and unfairly copied. In this case, however, noises and the like due to digital signal processing performed on the digital signal processing LSI 6 are included into an analog circuit portion included in the D/A converting LSI 7. As a result, another problem occurs. For example, the quality of an analog signal outputted from the D/A converting LSI 7 is degraded. When a DVD-Audio is reproduced, higher-speed digital signal processing (as compared with that in CD reproduction, for example) is performed, so that the quality is significantly degraded.

SUMMARY OF THE INVENTION

Therefore, an object of the present invention is to provide a DVD-Audio reproducing apparatus capable of preventing a digital signal immediately before being inputted to a D/A converting LSI from being taken out and unfairly copied.

The present invention has the following features to solve the problem above

A first aspect of the present invention is directed to a method of transmitting data between a first LSI and a second LSI which are connected to each other through an external bus The method comprises scrambling the data inside the first LSI, transmitting the scrambled data from the first LSI to the second LSI through the external bus, and descrambling the scrambled data inside the second LSI In the first aspect, the signal transmitted through the external bus between the first LSI and the second LSI is scrambled. Accordingly, even if the data is taken out of the external bus and unfairly copied, the data cannot be reproduced.

A second aspect is directed to a method of transmitting, in a DVD-Audio reproducing apparatus comprising a digital signal processing LSI and a D/A converting LSI which are connected to each other through an external bus for reproducing a DVD-Audio disk, a digital signal from the digital signal processing LSI to the D/A converting LSI through the external bus. The method comprises, inside the digital signal processing LSI, processing the digital signal which has been read out of the DVD-Audio disk, and scrambling the digital signal which has been processed, transmitting the scrambled digital signal from the digital signal processing LSI to the D/A converting LSI through the external bus, and, inside the D/A converting LSI, descrambling the scrambled digital signal transmitted through the external bus and converting the digital signal which has been descrambled into an analog signal.

In the second aspect (and in the following third aspect), the digital signal transmitted through the external bus between the digital signal processing LSI and the D/A converting LSI is scrambled. Accordingly even if the digital signal is taken out of the external bus and unfairly copied, the digital signal cannot be reproduced.

A third aspect is directed to a DVD-Audio reproducing apparatus for reproducing a DVD-Audio disk. The apparatus comprises a digital signal processing LSI and a D/A converting LSI, which are connected to each other through an external bus The digital signal processing LSI comprises digital signal processing means for processing a digital signal which has been read out of the DVD-Audio disk, and scrambling processing means for scrambling the digital signal outputted from the digital signal processing means. The D/A converting LSI comprises descrambling processing means for descrambling the scrambled digital signal transmitted through the external bus, and D/A conversion means for converting the digital signal outputted from the descrambling processing means into an analog signal.

According to a first embodiment, the apparatus further comprises header reading means for reading attribute information relating to a digital signal, which has been read out of the DVD-Audio disk, described in a header attached to each of packets composing the digital signal, a header analysis portion for analyzing the attribute information which has been read by the header reading means, and scrambling/descrambling control means for controlling the scrambling processing means and the descrambling processing means on the basis of the result of the analysis by the header analysis portion.

In the first embodiment, scrambling/descrambling corresponding to the attribute of the digital signal is performed.

According to a first exemplary embodiment, the attribute information includes information relating to the quality of a sound obtained by reproducing the digital signal (hereinafter referred to as the quality of the digital signal), and the scrambling/descrambling control means controls the scrambling processing means and the descrambling processing means on the basis of the quality of the digital signal which is represented by the result of the analysis by the header analysis portion such that secrecy conforming to the quality of the digital signal is realized In the first exemplary embodiment, scrambling/descrambling is performed such that secrecy conforming to the quality of the digital signal is realized (for example, the higher the quality of a signal is, the higher the secrecy to be realized by the signal is). As a result, the efficiency of scrambling/descrambling processing also improves.

According to a first specific exemplary embodiment, the quality of the digital signal is the sampling frequency and/or the number of quantization bits of the digital signal.

According to a second specific exemplary embodiment, the scrambling/descrambling control means has a table in which qualities at a plurality of levels which are previously determined with respect to the digital signal and identifiers assigned to a plurality of scrambling/descrambling information for realizing secrecy conforming to each of the qualities are described with a one-to-one correspondence established therebetween, and the plurality of scrambling/descrambling information The scrambling/descrambling control means refers to the table, to select the scrambling/descrambling information corresponding to the quality of the digital signal which is represented by the result of the analysis by the header analysis portion. Further, the scrambling/descrambling control means feeds the selected scrambling/descrambling information to the scrambling processing means and the descrambling processing means, to control the scrambling processing means and the descrambling processing means.

According to a more specific exemplary embodiment, the scrambling/descrambling control means comprises a scrambling/descrambling information selection portion having the table, and referring to the table to select the scrambling/descrambling information corresponding to the quality of the digital signal which is represented by the result of the analysis by the header analysis portion and outputting the identifier assigned to the selected scrambling/descrambling information, a scrambling control portion having the plurality of scrambling information, and feeding to the scrambling processing means the scrambling information corresponding to the identifier which has been outputted by the scrambling/descrambling information selection portion out of the plurality of scrambling information, and a descrambling control portion having the plurality of descrambling information, and feeding to the descrambling processing means the descrambling information corresponding to the identifier which has been outputted by the scrambling/descrambling information selection portion out of the plurality of descrambling information. The scrambling control portion is included inside the digital signal processing LSI, and the descrambling control portion being included inside the D/A converting LSI.

In the more specific exemplary embodiment, the scrambling control portion having the plurality of scrambling information is included inside the digital signal processing LSI, and the descrambling control portion having the plurality of descrambling information is included inside the D/A converting LSI. Accordingly, the scrambling/descrambling information does not leak. As a result, the digital signal which has been unfairly copied cannot be reproduced.

According to a third specific exemplary embodiment, the attribute information includes information indicating which position is the boundary of tracks in the digital signal, and the scrambling/descrambling control means has a plurality of scrambling/descrambling information, and selects any one of the plurality of scrambling/descrambling information in units of tracks in response to an instruction by a user and feeds the selected scrambling/descrambling information to the scrambling processing means and the descrambling processing means In the third specific exemplary embodiment, the boundary between a track (corresponding to a piece of music) and another track is detected, to select the scrambling/descrambling information in units of tracks upon receipt of the instruction by the user.

According to a fourth specific exemplary embodiment, the attribute information includes information indicating which position is the boundary of groups in the digital signal, and the scrambling/descrambling control means has a plurality of scrambling/descrambling information, and selects any one of the plurality of scrambling/descrambling information in units of groups in response to an instruction by a user and feeds the selected scrambling/descrambling information to the scrambling processing means and the descrambling processing means.

In the fourth specific exemplary embodiment, the boundary between a group (corresponding to one album comprising a plurality of pieces of music) and another group is detected, to select the scrambling/descrambling information in units of groups upon receipt of the instruction by the user According to a second embodiment, the scrambling processing means scrambles the digital signal outputted from the digital signal processing means in units of sample points for each channel.

According to a third embodiment, the scrambling processing means scrambles the digital signal outputted from the digital signal processing means in units of bytes for each channel According to a fourth embodiment, the scrambling processing means scrambles the digital signal outputted from the digital signal processing means in units of sample points between channels.

According to a fifth embodiment, the scrambling processing means scrambles the digital signal outputted from the digital signal processing means in units of bytes between channels These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram showing parts of the contents of scrambling/descrambling information and a table which are held by a scrambling/descrambling control portion 22 shown in FIG. 8.

FIG. 12 is a timing chart showing a digital signal outputted from the digital signal processing LSI 6 shown in FIG. 11 (in a case where the number of channels is two).

DESCRIPTION OF THE PREFERRED EMBODIMENTS (First Embodiment)

Figure 1:
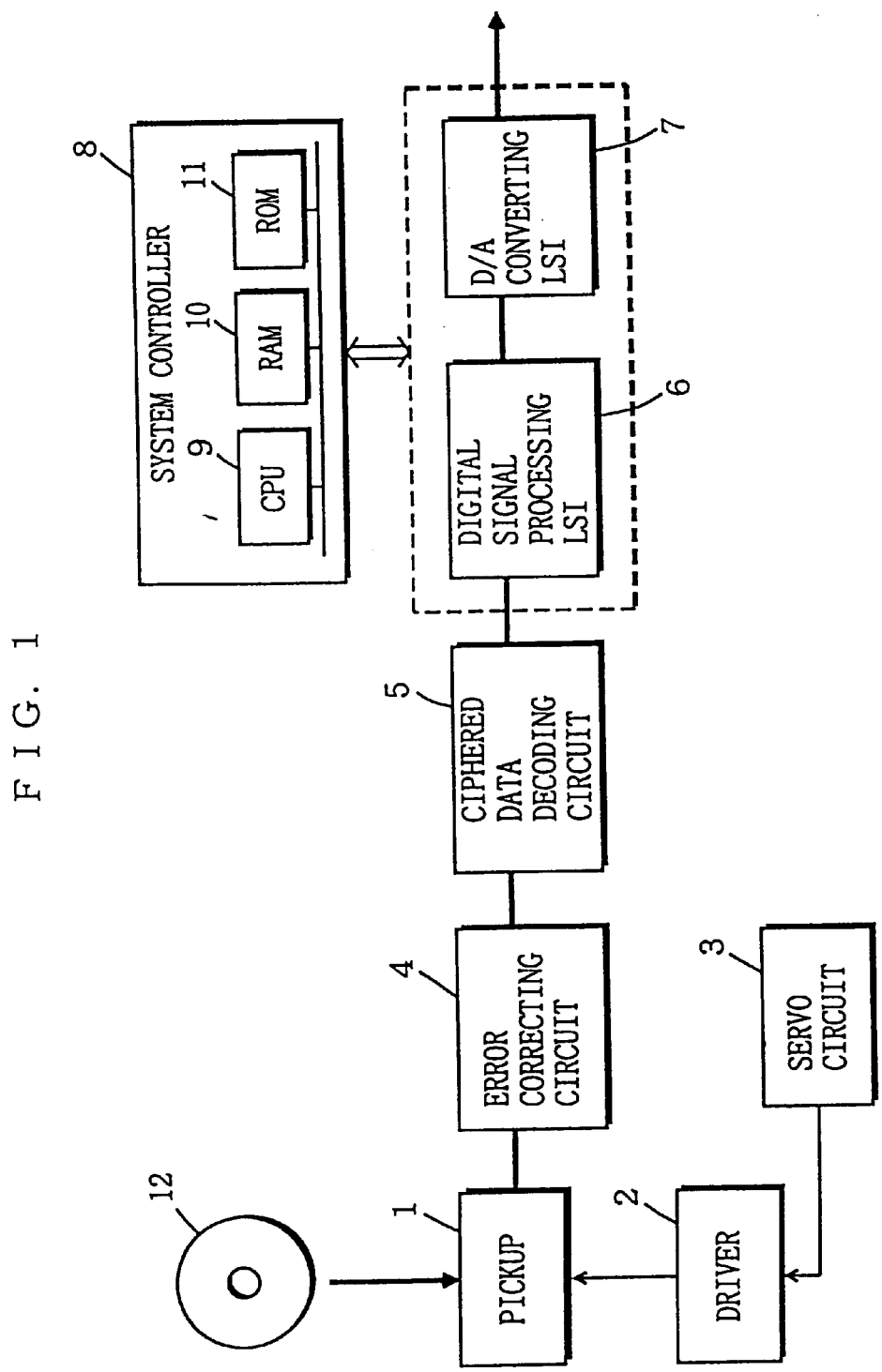
FIG. 1 is a block diagram showing the configuration of a DVD-Audio reproducing apparatus according to a first embodiment of the present invention (cited for second and third embodiments).

FIG. 1 is a block diagram showing the configuration of a DVD-Audio reproducing apparatus according to a first embodiment of the present invention.

In FIG. 1, the DVD-Audio reproducing apparatus comprises a pickup 1, a driver, 2 a servo circuit 3, an error correcting circuit 4, a ciphered data decoding circuit 5, the digital signal processing LSI 6, the D/A converting LSI 7, and a system controller 8.

The pickup 1 reads out a digital signal from a DVD-Audio disk 12. The driver 2 drives the pickup 1. The servo circuit 3 keeps the movement of the driver 2 stable. The error correcting circuit 4 corrects an error in the digital signal outputted from the pickup 1. The ciphered data decoding circuit 5 decodes the digital signal, which has been previously ciphered, outputted from the error correcting circuit 4.

The digital signal processing LSI 6 processes the digital signal outputted from the ciphered data decoding circuit 5. The D/A converting LSI 7 converts the digital signal outputted from the digital signal processing LSI 6 into an analog signal.

The system controller 8 comprises a CPU 9, RAM 10, ROM 11, and so forth, and controls the digital signal processing LSI 6 and the D/A converting LSI 7.

Each of the circuits (3 to 5) may be realized in a software manner.

The outline of the operation of the DVD-Audio reproducing apparatus configured as described above will be described below.

In FIG. 1, the DVD-Audio disk 12 is set in the DVD-Audio reproducing apparatus When a PLAY button (not shown) is pressed, the disk 12 starts to rotate upon being driven by a motor (not shown). On the other hand, the pickup 1 reads out the digital signal from the rotating disk 12 while moving along the radius of the disk 12 upon being driven by the driver 2 While the digital signal is being thus read out of the disk 12, the movement of the driver 2 is kept stable by the servo circuit 3.

The error correcting circuit 4 receives the digital signal outputted from the pickup 1, to correct the error in the digital signal. The ciphered data decoding circuit 5 receives the digital signal, which has been previously ciphered, outputted from the error correcting circuit 4, to decode the digital signal. The error correction and the ciphered data decoding are not directly related to the gist of the present invention and hence, the description thereof is omitted.

The digital signal processing LSI 6 processes the digital signal outputted from the ciphered data decoding circuit 5 upon being controlled by the system controller 8, to generate a digital audio signal and a digital video signal (the latter signal is not indispensable)

Figure 2A:
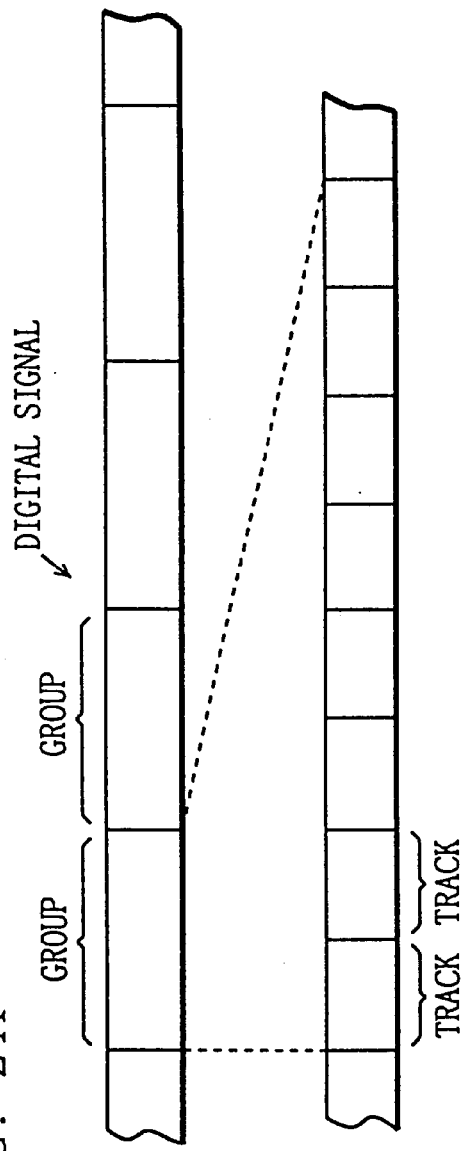
FIG. 2A is a schematic view showing the content of a digital signal inputted to a digital signal processing LSI 6 shown in FIG. 1.
Figure 2B:
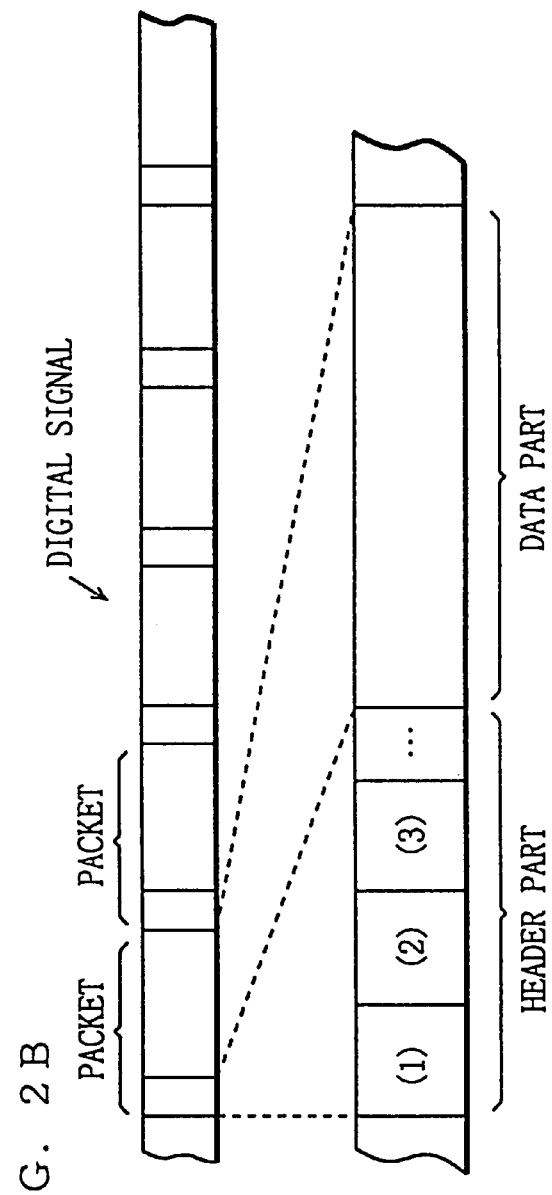
FIG. 2B is a schematic view showing the structure of the digital signal inputted to the digital signal processing LSI 6 shown in FIG. 1.

A specific example of the processing performed by the digital signal processing LSI 6 will be described FIG. 2A is a schematic view showing the content of the digital signal inputted to the digital signal processing LSI 6 shown in FIG. 1, and FIG. 2B is a schematic view showing the structure of the digital signal. In FIG. 2A, the digital signal is divided into a plurality of groups. Further, the group is divided into a plurality of tracks. "Track" corresponds to a piece of music, and "group" corresponds to an album comprising a plurality of pieces of music.

The digital signal having the above-mentioned content has the structure of a packet stream in which packets are serially connected to one another, as shown in FIG. 2B

The packet comprises a header part and a data part. The data part stores the digital audio signal (or the digital video signal). In the header part, attribute information relating to the signal is described.

Examples of the attribute information include: (1) information indicating whether the digital signal stored in the data part is an audio signal or a video signal; (2) the sampling frequency, the number of quantization bits, the channel number (i.e., information indicating which of first to sixth channels, for example, is included in a signal) of the digital signal in a case where the digital signal is the audio signal; and (3) information indicating that the digital signal stored in the data part is at the head or the end of the group or the track When the digital signal having the above-mentioned structure enters the digital signal processing LSI 6, the digital signal processing LSI 6 sequentially performs: ($\alpha$) processing for reading the content of a header attached to each of the packets (the above-mentioned attribute information); ($\beta$) processing for separating the digital signal into the audio signal and the video signal, and ($\gamma$) processing for generating the digital audio signal (and the digital video signal).

The attribute information read out of the header in the ($\alpha$) processing is reported to the system controller 8 from the digital signal processing LSI 6. The system controller 8 controls the digital signal processing LSI 6 on the basis of the reported attribute information As a result, the ($\beta$) processing and the ($\gamma$) processing are realized in the digital signal processing LSI 6

The digital video signal which has been generated in the digital signal processing LSI 6 is fed to an image processing circuit (not shown). On the other hand, the digital audio signal is transmitted to the D/A converting LSI 7 through the external buses 13 to 15.

The digital video signal is not directly related to the gist of the present invention and hence, the description thereof is omitted. Hereinafter, the digital audio signal is simply referred to as a "digital signal".

In the D/A converting LSI 7, the transmitted digital signal is converted into an analog signal, and the analog signal is outputted from the D/A converting LSI 7. In this case, this system controller 8 controls the D/A converting LSI 7 on the basis of the attribute information which has been reported from the digital signal processing LSI 6. Consequently, on the D/A converting LSI 7, D/A conversion processing corresponding to the number of channels, the sampling frequency, and the number of quantization bits of the digital signal is realized.

The foregoing is the outline of the operation of the DVD-Audio reproducing apparatus shown in FIG. 1.

Figure 3:
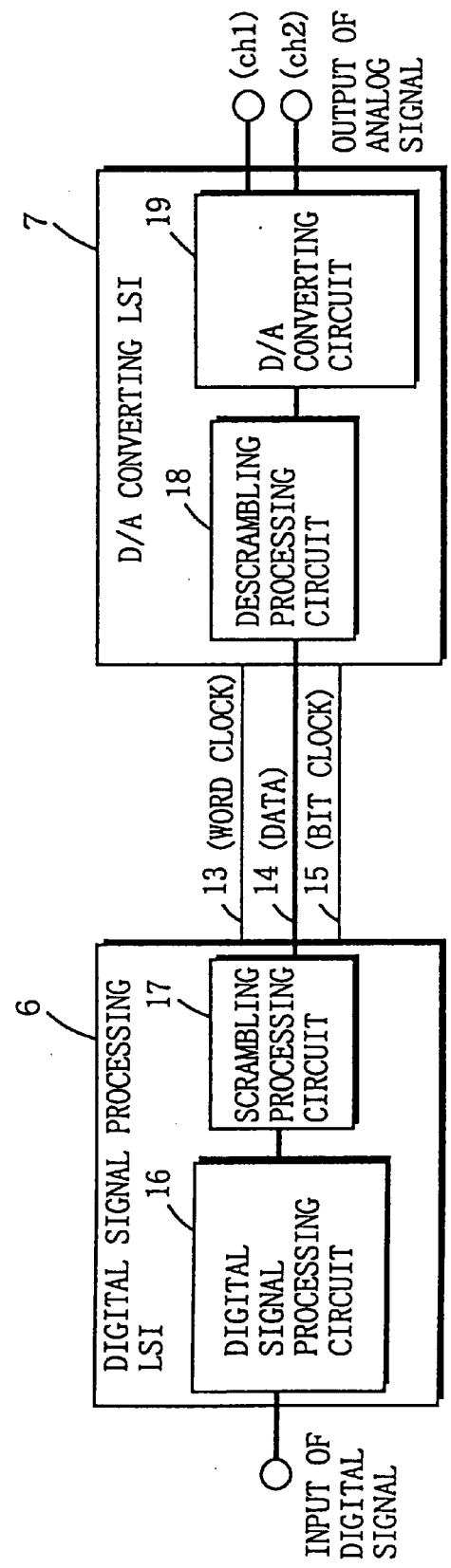
FIG. 3 is a diagram showing an example of the configuration of a portion related to the transmission of the digital signal from the digital signal processing LSI 6 to a D/A converting LSI 7 in the DVD-Audio reproducing apparatus shown in FIG. 1.

The transmission of the digital signal from the digital signal processing LSI 6 to the D/A converting LSI 7 which characterizes the present invention will be described in detail FIG. 3 is a diagram showing an example of the configuration of a portion related to the transmission of the digital signal from the digital signal processing LSI 6 to the D/A converting LSI 7 in the DVD-Audio reproducing apparatus shown in FIG. 1

In FIG. 3, the digital signal processing LSI 6 and the D/A converting LSI 7 are connected to each other through the external buses 13 to 15. The digital signal processing LSI 6 comprises a digital signal processing circuit 16 and a scrambling processing circuit 17 The D/A converting LSI 7 comprises a descrambling processing circuit 18 and a D/A converting circuit 19. Each of the circuits (16 to 19) may be realized in a software manner.

Figure 4:
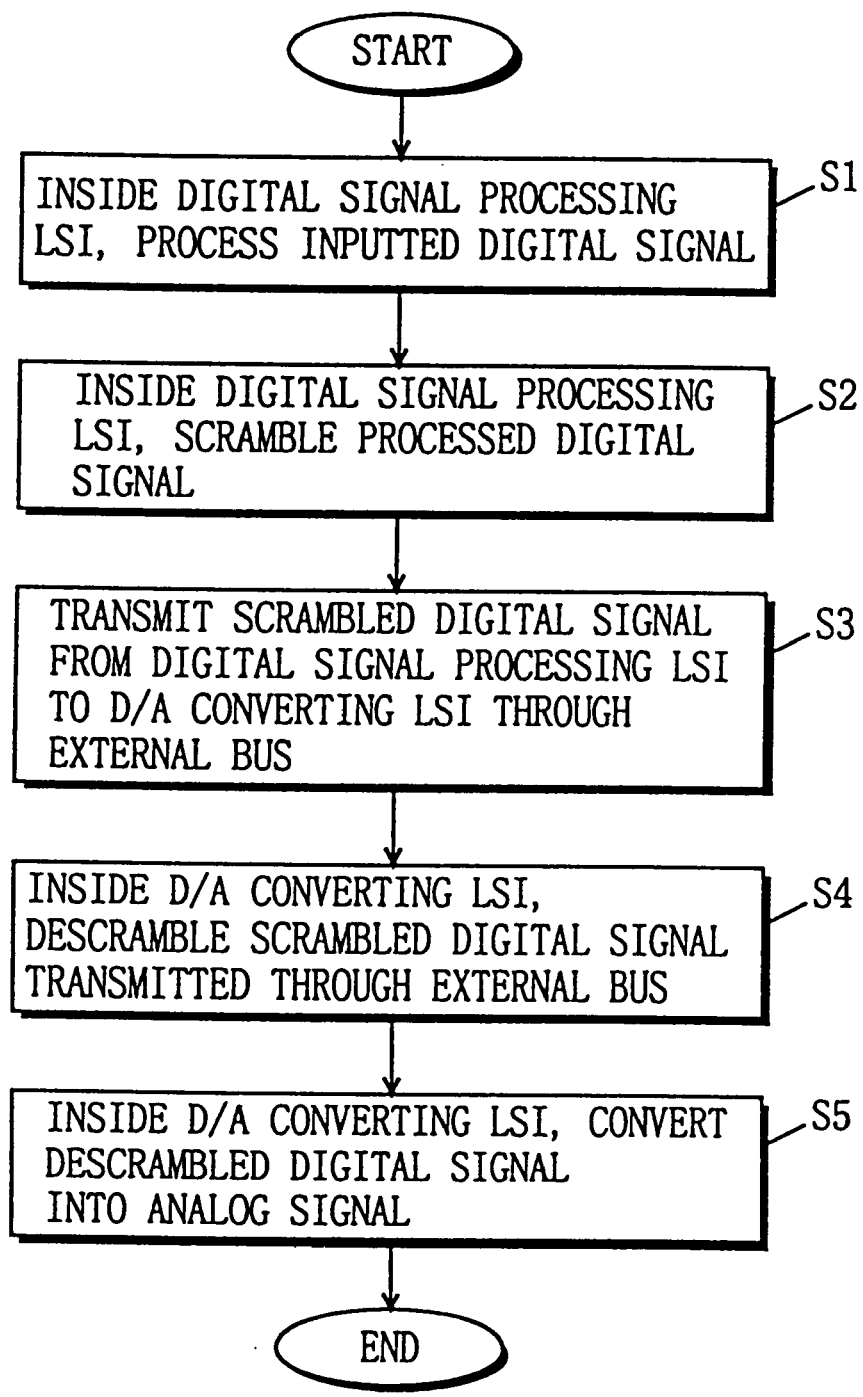
FIG. 4 is a diagram showing an example of the operation of the portion related to the transmission of the digital signal from the digital signal processing LSI 6 to the D/A converting LSI 7 in the DVD-Audio reproducing apparatus shown in FIG. 1.

FIG. 4 is a flow chart showing an example of the operation of the portion related to the transmission of the digital signal from the digital signal processing LSI 6 to the D/A converting LSI 7 in the DVD-Audio reproducing apparatus shown in FIG. 1.

In FIG. 4, in the digital signal LSI 6, the digital signal processing circuit 16 first processes the incoming digital signal (its specific example was described above) (step S1). The scrambling processing circuit 17 then scrambles the digital signal outputted from the digital signal processing circuit 16 (step S2).

The digital signal which has been scrambled in step S2 is transmitted from the digital signal processing LSI 6 to the D/A converting LSI 7 through the external buses 13 to 15 (step S3).

In the D/A converting LSI 7, the descrambling processing circuit 18 descrambles the digital signal which has been transmitted at the step S3 (i.e., the digital signal which has been scrambled by the scrambling processing circuit 17) (step S4). The D/A converting circuit 19 converts the digital signal outputted from the descrambling processing circuit 18 (i.e., the digital signal which has been descrambled) into an analog signal (step S5).

The foregoing is an example of the operation of the portion related to the transmission of the digital signal from the digital signal processing LSI 6 to the D/A converting LSI 7.

In the foregoing description, the digital signal outputted from the digital signal processing LSI 6 is indicated in the timing chart shown in FIG. 12 (see the prior art section). Description is now made of a specific example of the scrambling processing and the descrambling processing.

Figure 5:
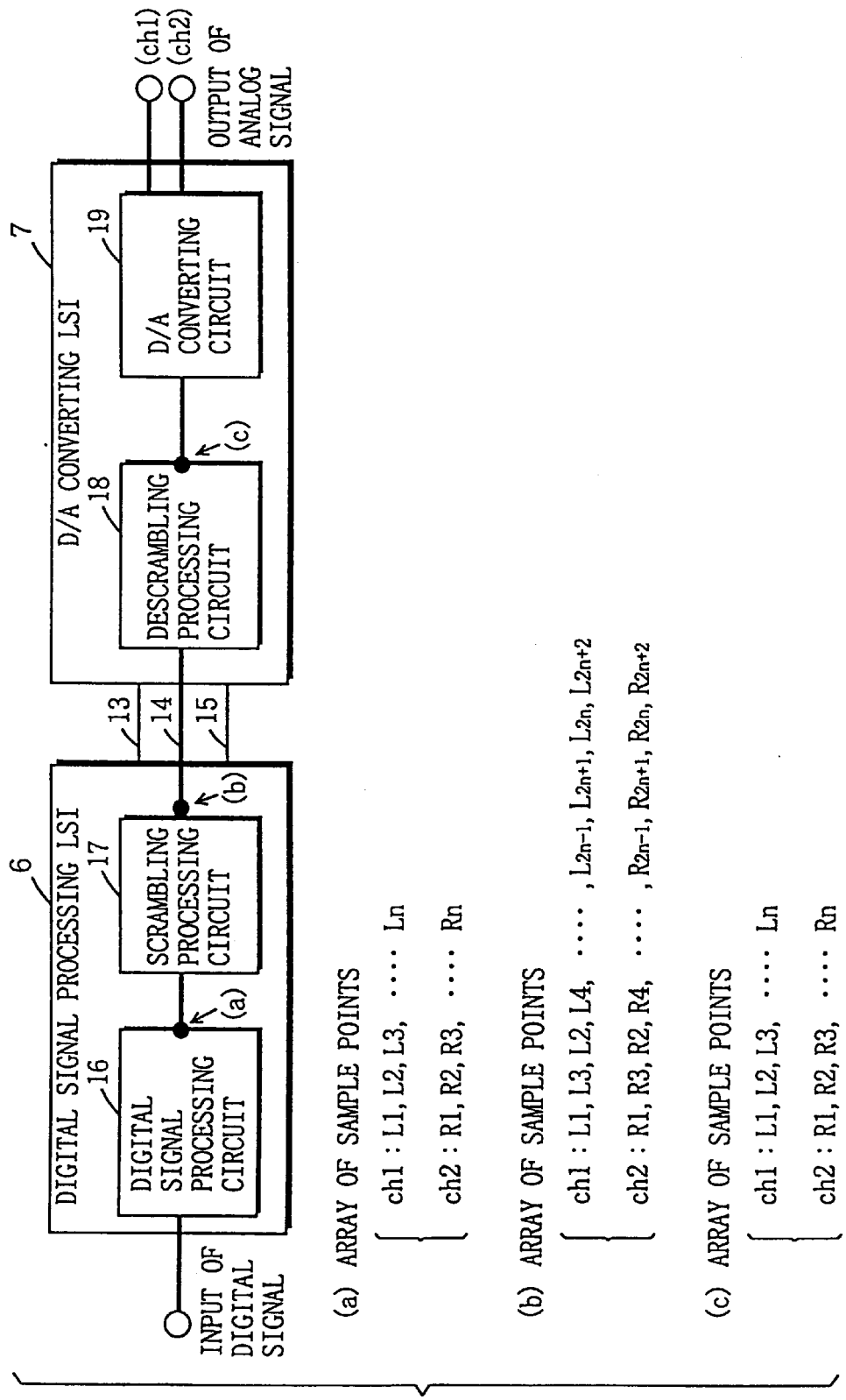
FIG. 5 is a diagram for explaining a first specific example of scrambling processing and descrambling processing which are performed in a scrambling processing circuit 17 and a descrambling processing circuit 18 shown in FIG. 3.
Figure 6:
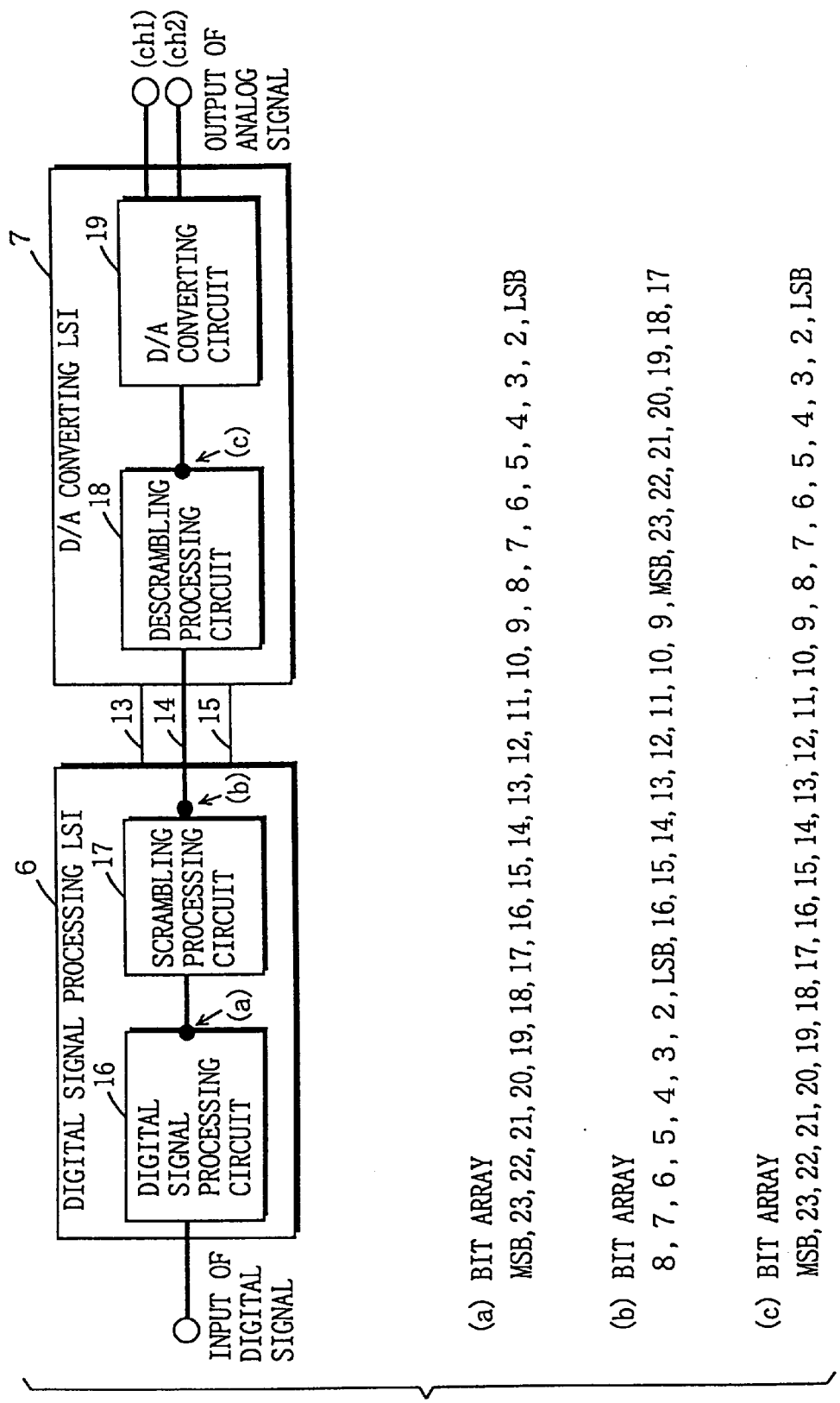
FIG. 6 is a diagram for explaining a second specific example of scrambling processing and descrambling processing which are performed in the scrambling processing circuit 17 and the descrambling processing circuit 18 shown in FIG. 3
Figure 7:
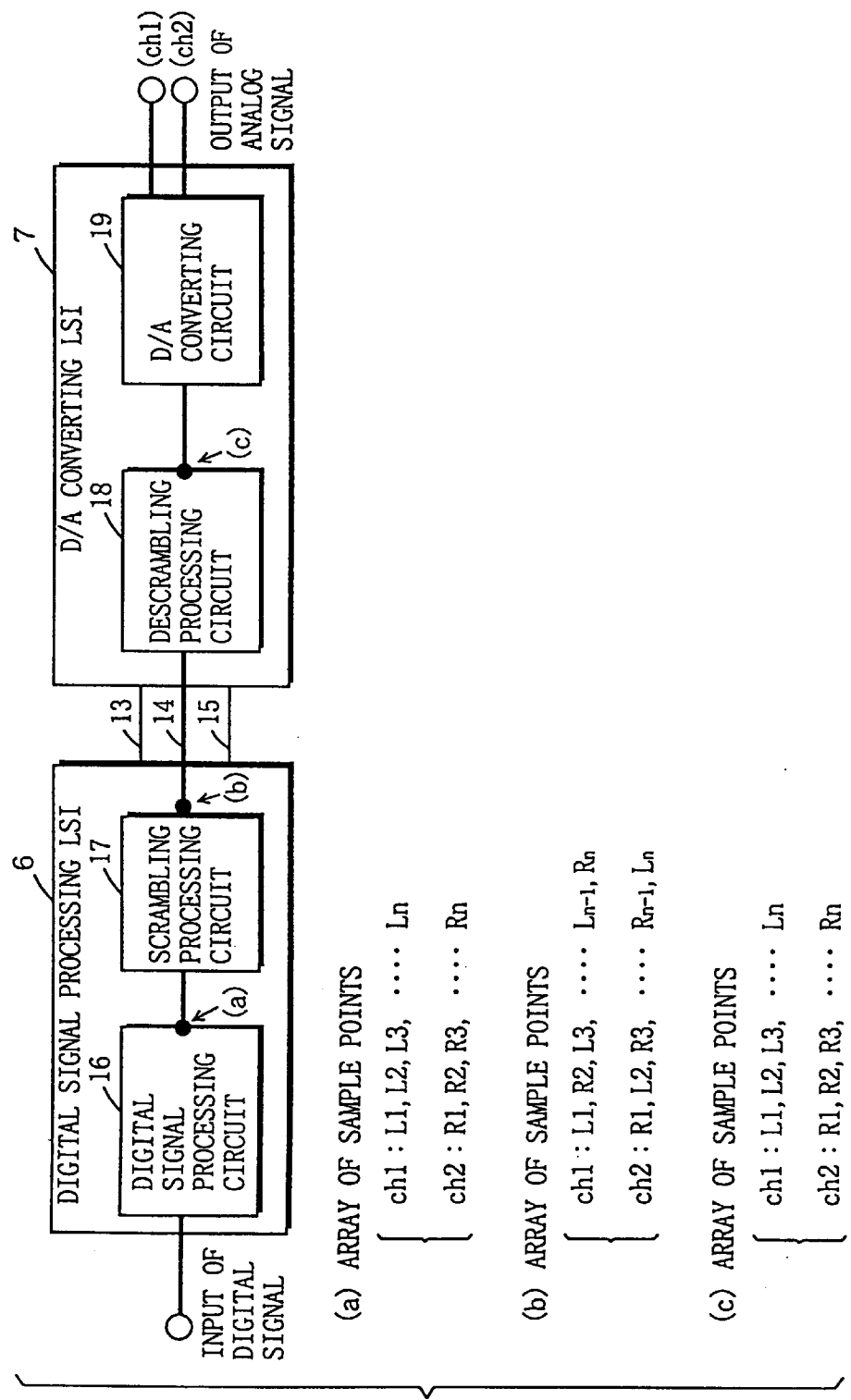
FIG. 7 is a diagram for explaining a third specific example of scrambling processing and descrambling processing which are performed in the scrambling processing circuit 17 and the descrambling processing circuit 18 shown in FIG. 3

FIGS. 5 to 7 are diagrams for explaining specific examples (first to third specific examples) of the scrambling processing and the descrambling processing which are performed in the scrambling processing circuit 17 and the descrambling processing circuit 18 shown in FIG. 3 The digital signal outputted from the digital signal processing circuit 16 is indicated in (a), the digital signal outputted from the scrambling processing circuit 17 is indicated in (b), and the digital signal outputted from the descrambling processing circuit 18 is indicated in (c), which are common among FIGS. 5 to 7.

The processing shown in FIG. 5 is an example of such scrambling processing that the digital signal is scrambled in units of sample points for each channel, that is, the sample points are rearranged on the time axis inside one channel In FIG. 5, the digital signal (a) outputted from the digital signal processing circuit 16 comprises two channels ch1 and ch2. n sample points {L1, L2, L3, Ln} are included in this order in the channel ch1. Similarly, n sample points {R1, R2, R3, Rn} are included in this order in the channel ch2.

When the digital signal (a) is inputted to the scrambling processing circuit 17, scrambling processing for rearranging the sample points included in the signal in accordance with a predetermined rule is performed in the scrambling processing circuit 17. Such scrambling processing that the four continuous sample points are taken as one group, and the second sample point and the third sample point in the group are replaced with each other shall be performed herein Consequently, in the digital signal (b) outputted from the scrambling processing circuit 17, the channel ch1 is represented by {L1, L3, L2, L4, L2n−1, L2n+1, L2n, L2n+2}, and the channel ch2 is represented by {R1, R3, R2, R4, R2n−1, R2n+1, R2n, R2n+2}.

When the digital signal (b) is inputted to the descrambling processing circuit 18, descrambling processing for rearranging the sample points included in the signal in accordance with a rule reverse to that used for the scrambling is performed in the descrambling processing circuit 18 (in each of the groups, the second sample point and the third sample point are replaced with each other again)

The same digital signal (c) as the digital signal (a) outputted from the digital signal processing circuit 16 is thus outputted from the descrambling processing circuit 18.

The processing shown in FIG. 6 is an example of such scrambling processing that the digital signal is scrambled in units of bytes for each channel, that is, the bytes are replaced on the time axis inside one channel.

In FIG. 6, each of the sample points composing the digital signal (a) outputted from the digital signal processing circuit 16 includes 24 bits {MSB, 23, 22, 21, 3, 2, LSB} in this order The eight bits from the head (MSB, 23, 22, 17) out of the 24 bits shall be referred to as a first byte, the subsequent eight bits (16, 15, 14, 9) shall be referred to as a second byte, and the last eight bits (8, 7, 6, LSB) shall be referred to as a third byte.

When the digital signal (a) is inputted to the scrambling processing circuit 17, scrambling processing for rearranging the bytes composing the signal in accordance with a predetermined rule is performed in the scrambling processing circuit 17 Such scrambling processing that the first byte and the third byte in each of the sample points are replaced with each other shall be performed herein.

Consequently, in the digital signal (b) outputted from the scrambling processing circuit 17, each of the sample points is represented by {(8, 7, 6, LSB), (16, 15, 14, 9), (MSB, 23, 22, 17)}

When the digital signal (b) is inputted to the descrambling processing circuit 18, descrambling processing for rearranging the bytes included in the signal in accordance with a rule reverse to that used for the scrambling is performed in the descrambling processing circuit 18 (in each of the sample points, the first byte and the third byte are replaced with each other again).

The same digital signal (c) as the digital signal (a) outputted from the digital signal processing circuit 16 is thus outputted from the descrambling processing circuit 18.

In the examples of the scrambling for each channel shown in FIGS. 5 and 6, the scrambling is performed, respectively, in units of sample points and bytes. The scrambling, however, may be performed in units of data sets other than the sample points and the bytes The processing shown in FIG. 7 is an example of such scrambling processing that the digital signal is scrambled in units of sample points between channels, that is, the digital signal is scrambled by replacing the sample points between a certain channel and another channel.

In FIG. 7, the digital signal (a) outputted from the digital signal processing circuit 16 comprises two channels ch1 and ch2. n sample points {L1, L2, L3, Ln} are included in this order in the channel ch1. Similarly, n sample points {R1, R2, R3, Rn} are included in this order in the channel ch2.

When the digital signal (a) is inputted to the scrambling processing circuit 17, scrambling processing for replacing the sample points in the channel ch1 in the signal and the sample points in the channel ch2 in the signal with each other in accordance with a predetermined rule is performed in the scrambling processing circuit 17. Such scrambling processing that the second, fourth, sixth, n-th sample points in the channel ch1 are respectively replaced with those in the channel ch2 shall be performed herein.

Consequently, in the digital signal (b) outputted from the scrambling processing circuit 17, the channel ch1 is represented by {L1, R2, L3, Ln−1, Rn}, and the channel ch2 is represented by {R1, L2, R3, Rn−1, Ln}.

Although in the example of the scrambling between the channels shown in FIG. 7, the scrambling is performed in units of sample points, the scrambling may be performed in units of bytes or in units of data sets other than the bytes.

When the digital signal (b) is inputted to the descrambling processing circuit 18, descrambling processing for rearranging the sample points in the channel ch1 in the signal and the sample points in the channel ch2 in the signal in accordance with a rule reverse to that used for the scrambling is performed in the descrambling processing circuit 18 (the second, fourth, sixth, n-th sample points in the channel ch1 may be respectively replaced with those in the channel ch2 again)

The same digital signal (c) as the digital signal (a) outputted from the digital signal processing circuit 16 is thus outputted from the descrambling processing circuit 18

As described above, in the DVD-Audio reproducing apparatus according to the first embodiment, the digital signal transmitted through the external buses 13 to 15 between the digital signal processing LSI 6 and the D/A converting LSI 7 is scrambled. Even if the digital signal is taken out of the external buses 13 to 15 and unfairly copied, therefore, the digital signal cannot be reproduced.

(Second Embodiment)

The overall configuration of a DVD-Audio reproducing apparatus according to a second embodiment of the present invention is the same as that in the first embodiment and hence, the block diagram of FIG. 1 is cited for the following description. The outline of the operation of the DVD-Audio reproducing apparatus is the same as that in the first embodiment and hence, the description thereof is not repeated.

Figure 8:
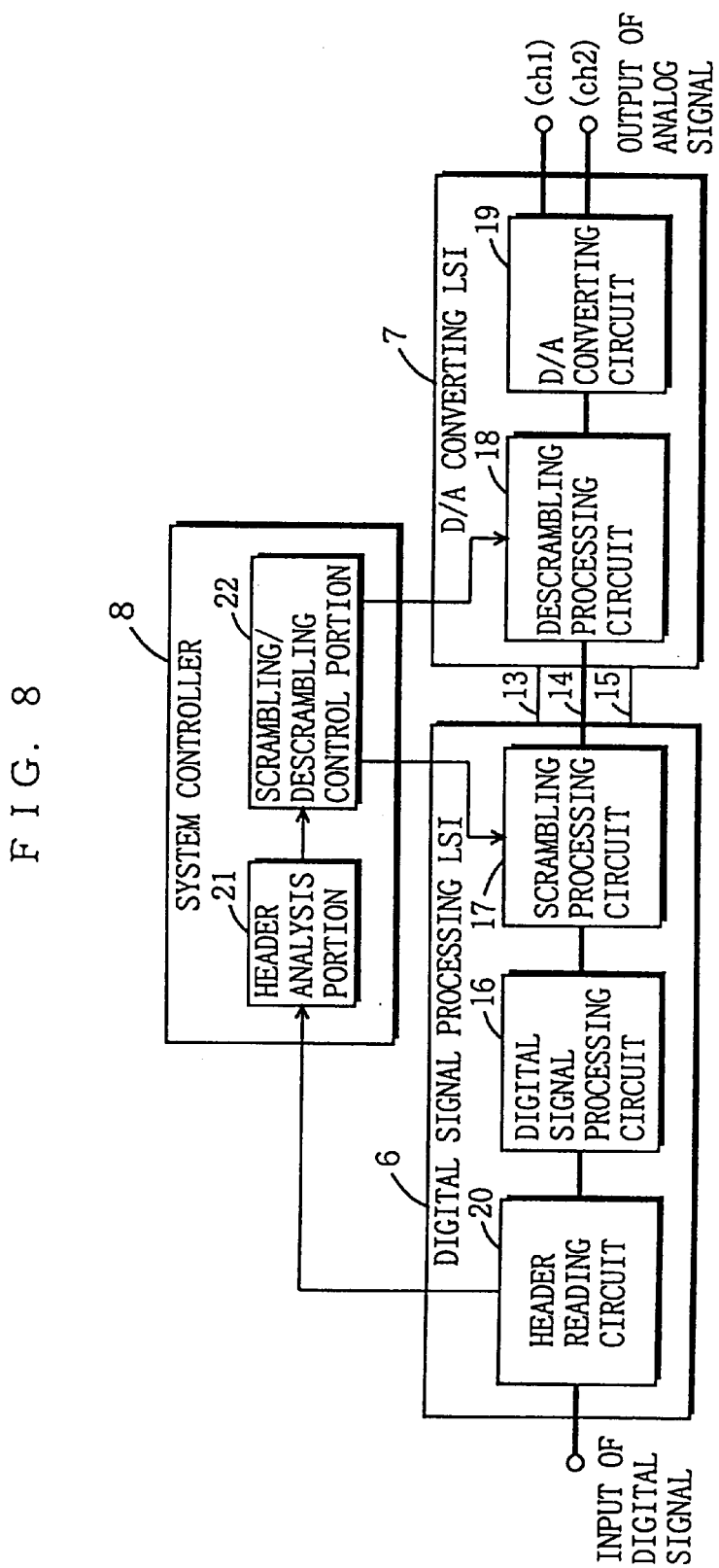
FIG. 8 is a diagram showing an example of the configuration of a portion related to the transmission of a digital signal between a digital signal processing LSI 6 and a D/A converting LSI 7 in a DVD-Audio reproducing apparatus (a second embodiment) shown in FIG. 1.

FIG. 8 is a diagram showing an example of the configuration of a portion related to the transmission of a digital signal between the digital signal processing LSI 6 and the D/A converting LSI 7 in the DVD-Audio reproducing apparatus shown in FIG. 1.

In FIG. 8, the digital signal processing LSI 6 and the D/A converting LSI 7 are connected to each other through the external buses 13 to 15. The digital signal processing LSI 6 comprises a header reading circuit 20, the digital signal processing circuit 16, and the scrambling processing circuit 17. The D/A converting LSI 7 comprises the descrambling processing circuit 18 and the D/A converting circuit 19 The system controller 8 comprises a header analysis portion 21 and a scrambling/descrambling control portion 22

Although in the present embodiment, the header reading circuit 20 is provided inside the digital signal processing LSI 6, it may be provided outside the LSI 6.

The header reading circuit 20 reads attribute information (see the first embodiment) described in a header (see FIG. 2) of a digital signal inputted to the digital signal processing LSI 6, and reports the information to the system controller

8. The digital signal processing circuit 16 processes the digital signal (see the first embodiment). The scrambling processing circuit 17 is controlled by the system controller 8, to scramble the digital signal outputted from the digital signal processing circuit 16.

The descrambling processing circuit 18 is controlled by the system controller 8, to descramble the digital signal which has been scrambled by the scrambling processing circuit 17. The D/A converting circuit 19 converts the digital signal outputted from the descrambling processing circuit 18 into an analog signal In the system controller 8, the header analysis portion 21 analyzes the attribute information which has been reported from the header reading circuit 20, and the scrambling/descrambling control portion 22 feeds scrambling information and descrambling information to the scrambling processing circuit 17 and the descrambling processing circuit 18, respectively upon receipt of the result of the analysis by the header analysis portion 21.

The header analysis portion 21 and the scrambling/descrambling control portion 22 are realized by the CPU 9 operating in accordance with a program previously stored in the ROM 11 shown in FIG. 1 The scrambling information and the descrambling information which are to be fed to the scrambling processing circuit 17 and the descrambling processing circuit 18 are previously stored in the ROM 11.

The scrambling/descrambling information is information in which the procedure for performing scrambling/descrambling is described When the processing shown in FIG. 5, for example, is performed by the scrambling processing circuit 17 and the descrambling processing circuit 18, the scrambling information is "four continuous sample points taken as one group, wherein the second sample point and the third sample point in the group are replaced with each other". In this case, the descrambling information may be the same as the scrambling information.

The scrambling/descrambling control portion 22 holds a plurality of sets of scrambling/descrambling information which differ in complexity of the procedure and a table for selecting any one of the sets of scrambling/descrambling information, and refers to the table upon receipt of the result of the analysis by the header analysis portion 21, to select any one of the sets of scrambling/descrambling information and feed the selected set of scrambling/descrambling information to the scrambling processing circuit 17 and the descrambling processing circuit 18.

The following, for example, are the scrambling/descrambling information and the table which are held by the scrambling/descrambling control portion 22.

FIG. 9 is a diagram showing parts of the contents of the scrambling/descrambling information and the table which are held by the scrambling/descrambling control portion 22 shown in FIG. 8. In FIG. 9, 192 kHz/24 bits, 96 kHz/24 bits, 48 kHz/24 bits, are each listed in column d of attribute information in the table, and identifiers (hereinafter referred to as IDs) #1, #2, #3, are respectively described in correspondence with the attribute information in columns of scrambling/descrambling information. #1, #2, #3, respectively correspond to the first scrambling/descrambling information, the second scrambling/descrambling information, the third scrambling/descrambling information, The first scrambling/descrambling information is information in which the procedure for scrambling/descrambling is the most complicated, and the second scrambling/descrambling information is information in which the procedure for scrambling/descrambling is the next most complicated. The third scrambling/descrambling information is information in which the procedure for scrambling/descrambling is the simplest out of the first to third scrambling/descrambling information.

Specifically, in the table, the scrambling/descrambling information in which the procedure for scrambling/descrambling is the most complicated (consequently, the highest secrecy can be realized) corresponds to a digital signal from which a highest-quality reproduced sound is obtained (a digital signal having a maximum sampling frequency in the example shown in FIG. 9). When the sampling frequencies are the same among the signals, which is not illustrated, the scrambling/descrambling information in which the procedure for scrambling/descrambling is more complicated corresponds to a digital signal having a larger number of quantization bits The scrambling/descrambling control portion 22 holding the substances of the scrambling/descrambling information and the table, as described above, refers to the stable upon receipt of the result of the analysis by the header analysis portion 21, that is, attribute information (a sampling frequency, etc ) relating to a digital signal stored in a packet to which its header is attached, to select the scrambling/descrambling information corresponding to the attribute information The substance of the selected scrambling/descrambling information is fed to the scrambling processing circuit 17 and the descrambling processing circuit 18.

The scrambling processing circuit 17 scrambles the digital signal outputted from the digital signal processing circuit 16 (for each packet) on the basis of the scrambling information fed from the scrambling/descrambling control portion 22. The descrambling processing circuit 18 descrambles the digital signal which has been scrambled by the scrambling processing circuit 17 (for each packet) on the basis of the descrambling information fed from the scrambling/descrambling control portion 22.

Each of the circuits (16 to 19 and 20) may be realized in a software manner As described above, in the DVD-Audio reproducing apparatus according to the second embodiment, the digital signal transmitted through the external buses 13 to 15 between the digital signal processing LSI 6 and the D/A converting LSI 7 is scrambled. Even if the digital signal is taken out of the external buses 13 to 15 and unfairly copied, therefore, the digital signal cannot be reproduced.

As the scrambling/descrambling information for performing scrambling/descrambling, a plurality of types of scrambling information which differ in complexity (in other words, a plurality of scrambling information which differ in the degree of secrecy to be realized) are previously prepared, and the scrambling information to be used is changed depending on the quality of the digital signal to be transmitted Accordingly, the scrambling/descrambling with high efficiency conforming to the quality of the digital signal can be performed. For example, as the quality of a signal increases, the secrecy to be realized by the signal correspondingly increases.

The quality of the digital signal is judged, in the digital signal processing LSI 6, by referring to the content of a header attached to each of packets composing the incoming digital signal That is, in the header, the quality (a high or low sampling frequency, a large or small number of quantization bits, etc.) of the digital signal stored in the packet to which the header is attached is described. The quality can be judged by reading the header.

Supplementary explanation will now be made. In the case of DVD-Audio, the quality of the digital signal can be differently set for each unit of groups (albums) or tracks (pieces of music) on one disk If the scrambling/ descrambling information is selected on the basis of the quality of the digital signal as in the present embodiment, therefore, the scrambling/descrambling information to be used can be automatically switched among units of groups or tracks The scrambling/descrambling information may be arbitrarily designated by a user instead of being automatically selected depending on the quality of the digital signal by the DVD-Audio reproducing apparatus.

Specifically, the DVD-Audio reproducing apparatus may automatically detect the boundary between the tracks (the boundary between the groups), to select any one of the scrambling/descrambling information depending on an instruction by the user in units of groups or tracks. The boundary between the tracks (or the boundary between the groups) can be detected on the basis of attribute information (3) described in the header part shown in FIG. 2B. The attribute information (3) is information indicating that the digital signal stored in the data part is of the head or the end of the group or the track.

(Third Embodiment)

The overall configuration of a DVD-Audio reproducing apparatus according to a third embodiment of the present invention is the same as that in the first embodiment and hence, the block diagram of FIG. 1 is cited for the following description. The outline of the operation of the DVD-Audio reproducing apparatus is the same as that in the first embodiment and hence, the description thereof is not repeated.

Figure 10:
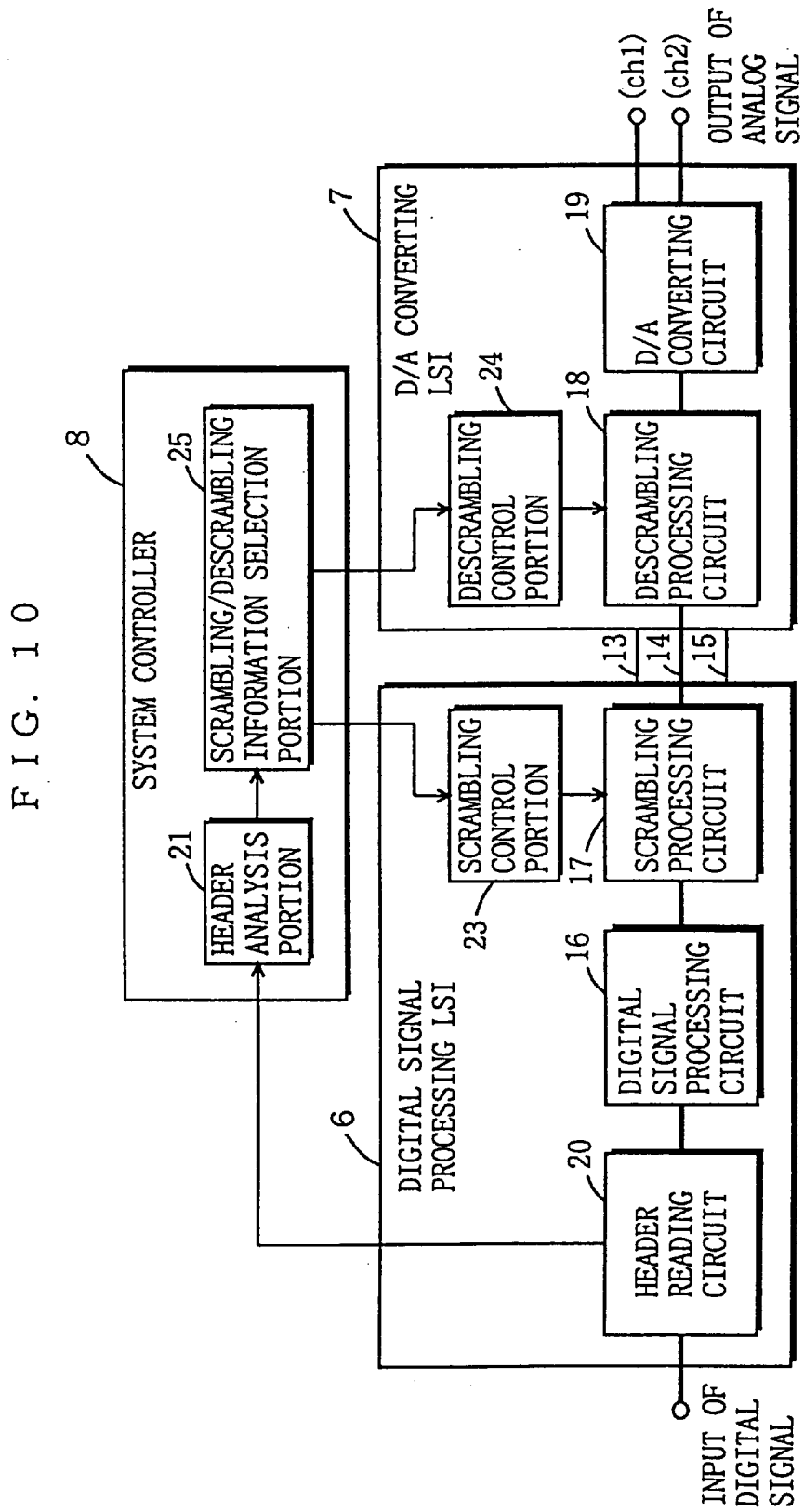
FIG. 10 is a diagram showing an example of the configuration of a portion related to the transmission of a digital signal between a digital signal processing LSI 6 and a D/A converting LSI 7 in a DVD-Audio reproducing apparatus (a third embodiment) shown in FIG. 1.
Figure 11:
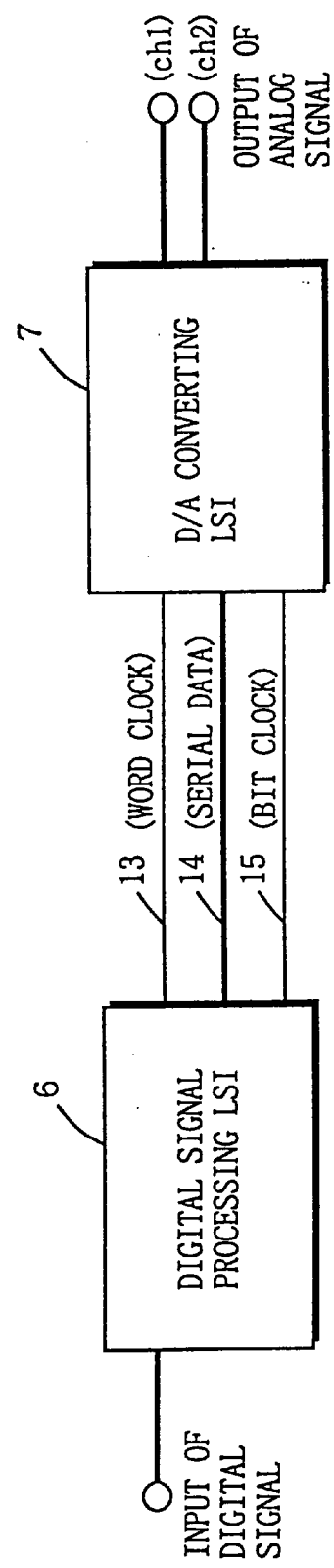
FIG. 11 is a diagram showing an example of the configuration of a portion related to the transmission of a digital signal from a digital signal processing LSI 6 to a D/A converting LSI 7 in a conventional DVD-Audio reproducing apparatus

FIG. 10 is a diagram showing an example of the configuration of a portion related to the transmission of a digital signal between a digital signal processing LSI 6 and a D/A converting LSI 7 in the DVD-Audio reproducing apparatus shown in FIG. 1.

In FIG. 10, the digital signal processing LSI 6 and the D/A converting LSI 7 are connected to each other through the external buses 13 to 15. The digital signal processing LSI 6 comprises the header reading circuit 20, the digital signal processing circuit 16, the scrambling processing circuit 17, and a scrambling control portion 23. The D/A converting LSI 7 comprises the descrambling processing circuit 18, a descrambling control portion 24, and the D/A converting circuit 19. A system controller 8 comprises the header analysis portion 21 and a scrambling/descrambling information selection portion 25.

The header reading circuit 20 reads attribute information (see the first embodiment) described in a header (see FIG. 2) of a digital signal inputted to the digital signal processing LSI 6, and reports the information to the system controller 8. The digital signal processing circuit 16 processes the digital signal (see the first embodiment). The scrambling processing circuit 17 is controlled by the scrambling control portion 23, to scramble the digital signal outputted from the digital signal processing circuit 16. The scrambling control portion 23 feeds the scrambling information to the scrambling processing circuit 17.

The scrambling control portion 23 is realized by a CPU (not shown) provided inside the digital signal processing LSI 6 operating in accordance with a program stored in ROM (not shown) provided inside the same LSI 6. The scrambling information to be fed to the scrambling processing circuit 17 is also previously stored in the ROM.

The descrambling processing circuit 18 is controlled by the descrambling control portion 24, to descramble the digital signal which has been scrambled by the scrambling processing circuit 17. The descrambling control portion 24 feeds the descrambling information to the descrambling processing circuit 18. The D/A converting circuit 19 converts the digital signal outputted from the descrambling processing circuit 18 into an analog signal The descrambling control portion 24 is realized by a CPU (not shown) provided inside the D/A converting LSI 7 operating in accordance with a program stored in ROM (not shown) provided inside the same LSI 7. The descrambling information which are to be fed to the descrambling processing circuit 18 are also previously stored in the ROM.

In the system controller 8, the header analysis portion 21 analyzes the attribute information which has been reported from the header reading circuit 20. The scrambling/descrambling information selection portion 25 chooses which of the scrambling/descrambling information should be selected upon receipt of the result of the analysis by the header analysis portion 21, and then reports an ID assigned to the selected scrambling/descrambling information to the scrambling control portion 23 and the descrambling control portion 24.

The header analysis portion 21 and the scrambling/descrambling information selection portion 25 are realized by the CPU 9 operating in accordance with the program previously stored in the ROM 11 shown in FIG. 1.

The scrambling/descrambling information is the same information, in which the procedure for performing scrambling/descrambling is described, as that in the second embodiment.

The present embodiment differs from the second embodiment in the following points That is, in the second embodiment, the system controller 8 holds respective substances of a plurality of sets of scrambling/descrambling information and a table for selecting any one of the sets of scrambling/descrambling information (see FIG. 9)

Contrary to this, in the present embodiment, the system controller 8 holds only the same table as that in the second embodiment. The substance of the scrambling information is held inside the digital signal processing LSI 6, and the substance of the descrambling information is held inside the D/A converting LSI 7.

In the system controller 8, the scrambling/descrambling information selection portion 25 holds the table The scrambling/descrambling information selection portion 25 refers to the table upon receipt of the result of the analysis by the header analysis portion 21, that is, attribute information (a sampling frequency, etc.) relating to a digital signal stored in a packet to which its header is attached, to select the scrambling/descrambling information corresponding to the attribute information (for each packet). The ID assigned to the selected scrambling/descrambling information is reported to the scrambling control portion 23 inside the digital signal processing LSI 6 and the descrambling control portion 24 inside the D/A converting LSI 7

In the digital signal processing LSI 6, the scrambling control portion 23 holds the plurality of scrambling information. The scrambling control portion 23 feeds to the scrambling processing circuit 17 the scrambling information corresponding to the ID which has been reported from the scrambling/descrambling information selection portion 25 in the system controller 8 out of the plurality of scrambling information. The scrambling processing circuit 17 scrambles the digital signal outputted from the digital signal processing circuit 16 (for each packet) on the basis of the scrambling information fed from the scrambling control portion 23.

In the D/A converting LSI 7, the descrambling control portion 24 holds the plurality of descrambling information. The descrambling control portion 24 feeds to the descrambling processing circuit 18 the descrambling information corresponding to the ID which has been reported from the scrambling/descrambling information selection portion 25 in the system controller 8 out of the plurality of descrambling information. The descrambling processing circuit 18 descrambles the digital signal which has been scrambled by the scrambling processing circuit 17 (for each packet) on the basis of the descrambling information fed from the descrambling control portion 24

Each of the circuits (16 to 19 and 20) may be realized in a software manner As described above, in the DVD-Audio reproducing apparatus according to the third embodiment, the digital signal transmitted through the external buses 13 to 15 between the digital signal processing LSI 6 and the D/A converting LSI 7 is scrambled. Even if the digital signal is taken out of the external buses 13 to 15 and unfairly copied, therefore, the digital signal cannot be reproduced As the scrambling/descrambling information for performing scrambling/descrambling, a plurality of types of scrambling information which differ in complexity (in other words, a plurality of scrambling information which differ in the degree of secrecy to be realized) are previously prepared, and the scrambling information to be used is changed depending on the quality of the digital signal to be transmitted. Accordingly, the scrambling/descrambling with high efficiency conforming to the quality of the digital signal can be performed. For example, the higher the quality of a signal is, the higher the secrecy to be realized by the signal is.

The quality of the digital signal is judged, in the digital signal processing LSI 6, by referring to the content of a header attached to each of packets composing the incoming digital signal. That is, in the header, the quality (a high or low sampling frequency, a large or small number of quantization bits, etc ) of the digital signal stored in the packet to which the header is attached is described. The quality can be judged by reading the header The substance of the scrambling information and the substance of the descrambling information are respectively held inside the digital signal processing LSI 6 and the D/A converting LSI 7. Only the ID assigned to the information to be used is reported to the digital signal processing LSI 6 and the D/A converting LSI 7 from the system controller 8, thereby eliminating the possibility that the scrambling/descrambling information leaks, so that the digital signal which has been unfairly copied can be reproduced (in the second embodiment, the scrambling/descrambling information may leak because the substance of the scrambling/descrambling information is reported to the digital signal processing LSI 6 and the D/A converting LSI 7 from the system controller 8).

In the first to third embodiments, particularly in the DVD-Audio reproducing apparatus, the digital signal transmitted between the digital signal processing LSI 6 and the D/A converting LSI 7 which are connected to each other through the external buses 13 to 15 is scrambled. The reason for this is that if the digital signal immediately before being inputted to the D/A converting LSI 7 is copied, an ultrahigh-quality stereo sound or the like can be easily reproduced form the copied signal.

Specifically, as in the first to third embodiments, the digital signal immediately before being inputted to the D/A converting LSI 7 is scrambled in the DVD-Audio reproducing apparatus, so that a particularly high unfair copying preventing effect is exhibited.

In addition thereto, in a CD reproducing apparatus, for example, a high unfair copying preventing effect is also exhibited by scrambling the digital signal immediately before being inputted to the D/A converting LSI.

More generally, a certain unfair copying preventing effect, although not so high as those in the first to third embodiments, is obtained by scrambling data transmitted among a plurality of LSIs which are connected to one another through external buses.

While the invention has been described in detail, the foregoing description is in all aspects illustrative and not restrictive. It is understood that numerous other modifications and variations can be devised without departing from the scope of the invention.

What is claimed is:

1. A method of transmitting, in a recording medium reproducing apparatus comprising a digital signal processing LSI and a D/A converting LSI which are connected to each other through an external bus for reproducing a recording medium, a digital signal from the digital signal processing LSI to the D/A converting LSI through the external bus, comprising the steps of:

processing inside the digital signal processing LSI the digital signal which has been read out of the recording medium;

scrambling inside the digital signal processing LSI the digital signal which has been processed;

transmitting the scrambled digital signal from the digital signal processing LSI to the D/A converting LSI through the external bus;

descrambling inside the D/A converting LSI the scrambled digital signal transmitted through the external bus; and converting inside the D/A converting LSI the digital signal which has been descrambled into an analog signal.

2. A recording medium reproducing apparatus for reproducing a recording medium, comprising:

a digital signal processing LSI comprising a digital signal processing means for processing a digital signal which has been read out of the recording medium and a scrambling processing means for scrambling the digital signal outputted from said digital signal processing means;

a D/A converting LSI comprising a descrambling processing means for descrambling the scrambled digital signal transmitted through said external bus and a D/A conversion means for converting the digital signal outputted from said descrambling processing means into an analog signal; and an external bus that connects said digital signal processing LSI to said D/A converting LSI.

3. The recording medium reproducing apparatus according to claim 2, further comprising:

header reading means for reading attribute information relating to a digital signal that has been read out of the recording medium, the attribute information being described in a header attached to each of packets composing the digital signal;

a header analysis portion for analyzing the attribute information which has been read by said header reading means; and scrambling/descrambling control means for controlling said scrambling processing means and said descrambling processing means on the basis of the result of the analysis by said header analysis portion.

4. The recording medium reproducing apparatus according to claim 3, wherein the attribute information includes information relating to the quality of a sound obtained by reproducing the digital signal hereinafter referred to as the quality of the digital signal, and wherein said scrambling/descrambling control means controls said scrambling processing means and said descrambling processing means on the basis of the quality of the digital signal which is represented by the result of the analysis by the header analysis portion such that secrecy conforming to the quality of the digital signal is realized.

5. The recording medium reproducing apparatus according to claim 4, wherein the quality of the digital signal is the sampling frequency and/or the number of quantization bits of the digital signal.

6. The recording medium reproducing apparatus according to claim 4, wherein said scrambling/descrambling control means has a plurality of scrambling/descrambling information and a table in which qualities at a plurality of levels which are previously determined with respect to the digital signal and identifiers assigned to the plurality of scrambling/descrambling information for realizing secrecy conforming to each of the qualities are described with a one-to-one correspondence established therebetween, wherein said scrambling/descrambling control means refers to the table to select the scrambling/descrambling information corresponding to the quality of the digital signal which is represented by the result of the analysis by the header analysis portion, and wherein said scrambling/descrambling control means feeds the selected scrambling/descrambling information to said scrambling processing means and said descrambling processing means to control said scrambling processing means and said descrambling processing means.

7. The recording medium reproducing apparatus according to claim 6, wherein said scrambling/descrambling control means comprises:

a scrambling/descrambling information selection portion having the table, and referring to the table to select the scrambling/descrambling information corresponding to the quality of the digital signal which is represented by the result of the analysis by said header analysis portion and outputting the identifier assigned to the selected scrambling/descrambling information;

a scrambling control portion having the plurality of scrambling information; and feeding to said scrambling processing means the scrambling information corresponding to the identifier which has been outputted by said scrambling/descrambling information selection portion out of the plurality of scrambling information; and a descrambling control portion having the plurality of descrambling information, and feeding to said descrambling processing means the descrambling information corresponding to the identifier which has been outputted by said scrambling/descrambling information selection portion out of the plurality of descrambling information, wherein said scrambling control portion is included inside said digital signal processing LSI, and wherein said descrambling control portion is included inside said D/A converting LSI.

8. The recording medium reproducing apparatus according to claim 3, wherein the attribute information includes information indicating which position is the boundary of tracks in the digital signal, and said scrambling/descrambling control means has a plurality of scrambling/descrambling information, and selects any one of the plurality of scrambling/descrambling information in units of tracks in response to an instruction by a user and feeds the selected scrambling/descrambling information to said scrambling processing means and said descrambling processing means.

9. The recording medium reproducing apparatus according to claim 3, wherein said attribute information includes information indicating which position is the boundary of groups in said digital signal, and wherein said scrambling/descrambling control means has a plurality of scrambling/descrambling information, and selects any one of the plurality of scrambling/descrambling information in units of groups in response to an instruction by a user and feeds the selected scrambling/descrambling information to said scrambling processing means and said descrambling processing means.

10. The recording medium reproducing apparatus according to claim 2, wherein said scrambling processing means scrambles the digital signal outputted from said digital signal processing means in units of sample points for each channel.

11. The recording medium reproducing apparatus according to claim 2, wherein said scrambling processing means scrambles the digital signal outputted from said digital signal processing means in units of bytes for each channel.

12. The recording medium reproducing apparatus according to claim 2, wherein said scrambling processing means scrambles the digital signal outputted from said digital signal processing means in units of sample points between channels.

13. The recording medium reproducing apparatus according to claim 2, wherein said scrambling processing means scrambles the digital signal outputted from said digital signal processing means in units of bytes between channels.

14. A method of transmitting, in a recording medium reproducing apparatus comprising a digital signal processor and a D/A converter which are connected to each other through an external bus for reproducing a recording medium, a digital signal from the digital signal processor to the D/A converter through the external bus, comprising:

processing inside the digital signal processor, the digital signal which has been read out of the recording medium, scrambling inside the digital signal processor, the digital signal which has been processed;

transmitting the scrambled digital signal from the digital signal processor to the D/A converter through the external bus;

descrambling inside the D/A converter, the scrambled digital signal transmitted through the external bus; and converting inside the D/A converter, the digital signal which has been descrambled into an analog signal.

15. A recording medium reproducing apparatus for reproducing a recording medium, comprising a digital signal processor comprising a digital signal processing portion for processing a digital signal which has been read out of the recording medium and a scrambling processor for scrambling the digital signal outputted from said digital signal processing portion;

a D/A converter comprising a descrambling processor for descrambling the scrambled digital signal transmitted through said external bus and a D/A conversion portion for converting the digital signal outputted from said descrambling processor into an analog signal; and an external bus that connects said digital signal processor to said D/A converter.

16. The recording medium reproducing apparatus according to claim 15, further comprising:
a header reader for reading attribute information relating to a digital signal that has been read out of the recording medium, the attribute information being described in a header attached to each of packets composing the digital signal;
a header analysis portion for analyzing the attribute information which has been read by said header reader; and
a scrambling/descrambling controller for controlling said scrambling processor and said descrambling processor on the basis of the result of the analysis by said header analysis portion.

17. The recording medium reproducing apparatus according to claim 16, wherein the attribute information includes information relating to the quality of a sound obtained by reproducing the digital signal hereinafter referred to as the quality of the digital signal, and
wherein said scrambling/descrambling controller controls said scrambling processor and said descrambling processor on the basis of the quality of the digital signal which is represented by the result of the analysis by the header analysis portion such that secrecy conforming to the quality of the digital signal is realized.

18. The recording medium reproducing apparatus according to claim 17, wherein the quality of the digital signal is the sampling frequency and/or the number of quantization bits of the digital signal.

19. The recording medium reproducing apparatus according to claim 17, wherein said scrambling/descrambling controller has a plurality of scrambling/descrambling information and a table in which qualities at a plurality of levels which are previously determined with respect to the digital signal and identifiers assigned to the plurality of scrambling/descrambling information for realizing secrecy conforming to each of the qualities are described with a one-to-one correspondence established therebetween,
wherein said scrambling/descrambling controller refers to the table, to select the scrambling/descrambling information corresponding to the quality of the digital signal which is represented by the result of the analysis by the header analysis portion, and
wherein said scrambling/descrambling controller feeds the selected scrambling/descrambling information to said scrambling processor and said descrambling processor, to control said scrambling processor and said descrambling processor.

20. The recording medium reproducing apparatus according to claim 19, wherein said scrambling/descrambling controller comprises:
a scrambling/descrambling information selection portion having the table, and referring to the table to select the scrambling/descrambling information corresponding to the quality of the digital signal which is represented by the result of the analysis by said header analysis portion and outputting the identifier assigned to the selected scrambling/descrambling information;
a scrambling control portion having the plurality of scrambling information, and feeding to said scrambling processor the scrambling information corresponding to the identifier which has been outputted by said scrambling/descrambling information selection portion out of the plurality of scrambling information; and
a descrambling control portion having the plurality of descrambling information, and feeding to said descrambling processor the descrambling information corresponding to the identifier which has been outputted by said scrambling/descrambling information selection portion out of the plurality of descrambling information,
wherein said scrambling control portion is included inside said digital signal processor, and
wherein said descrambling control portion is included inside said D/A converter.

21. The recording medium reproducing apparatus according to claim 16, wherein the attribute information includes information indicating which position is the boundary of tracks in the digital signal, and
said scrambling/descrambling controller has a plurality of scrambling/descrambling information, and selects any one of the plurality of scrambling/descrambling information in units of tracks in response to an instruction by a user and feeds the selected scrambling/descrambling information to said scrambling processor and said descrambling processor.

22. The recording medium reproducing apparatus according to claim 16, wherein said attribute information includes information indicating which position is the boundary of groups in said digital signal, and
wherein said scrambling/descrambling controller has a plurality of scrambling/descrambling information, and selects any one of the plurality of scrambling/descrambling information in units of groups in response to an instruction by a user and feeds the selected scrambling/descrambling information to said scrambling processor and said descrambling processor.

23. The recording medium reproducing apparatus according to claim 15, wherein said scrambling processor scrambles the digital signal outputted from said digital signal processor in units of sample points for each channel.

24. The recording medium reproducing apparatus according to claim 15, wherein said scrambling processor scrambles the digital signal outputted from said digital signal processor in units of bytes for each channel.

25. The recording medium reproducing apparatus according to claim 15, wherein said scrambling processor scrambles the digital signal outputted from said digital signal processor in units of sample points between channels.

26. The recording medium reproducing apparatus according to claim 15, wherein said scrambling processor scrambles the digital signal outputted from said digital signal processor in units of bytes between channels.

* * * * *

UNITED STATES PATENT AND TRADEMARK OFFICE
CERTIFICATE OF CORRECTION

PATENT NO. : 6,760,286 B2
DATED : July 6, 2004
INVENTOR(S) : Akihisa Kawamura et al.

It is certified that error appears in the above-identified patent and that said Letters Patent is hereby corrected as shown below:

Title page,
Item [*] Notice, please change "U.S.C. 154(b) bydays.days." to -- U.S.C. 154(b) by 69 days. --.
Item [30], Foreign Application Priority Data, please change "11-598334" to -- 173571/1999 --.
Item [56], References Cited, U.S. PATENT DOCUMENTS, please change
"5,818,655 A    10/1998       Satoh et al." to -- 5,818,655 A   7/1995  Satoh et al. --.
"5,835,499 A    11/1998       Kimura et al." to -- 5,835,499 A 9/1996  Kimura et al. --.

Column 17,
Line 45, please change "information;" to -- information, --.

Column 18,
Line 45, please change "medium," to -- medium; --.
Line 56, please change "comprising" to -- comprising: --.

Signed and Sealed this

Seventh Day of December, 2004

JON W. DUDAS
*Director of the United States Patent and Trademark Office*